United States Patent
McQuillen et al.

(10) Patent No.: US 10,259,336 B2
(45) Date of Patent: Apr. 16, 2019

(54) CHARGING A BATTERY USING INTERPACK SWITCH

(71) Applicant: FORD GLOBAL TECHNOLOGIES, LLC, Dearborn, MI (US)

(72) Inventors: Michael McQuillen, Warren, MI (US); Philip Michael Gonzales, Dearborn, MI (US); Gopichandra Surnilla, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 199 days.

(21) Appl. No.: 15/296,595

(22) Filed: Oct. 18, 2016

(65) Prior Publication Data
US 2018/0105060 A1    Apr. 19, 2018

(51) Int. Cl.
| H01M 10/44 | (2006.01) |
| H01M 10/46 | (2006.01) |
| B60L 11/18 | (2006.01) |
| H02J 7/00  | (2006.01) |

(52) U.S. Cl.
CPC ....... *B60L 11/1864* (2013.01); *B60L 11/1844* (2013.01); *B60L 11/1861* (2013.01); *H02J 7/0068* (2013.01); *Y02E 60/721* (2013.01); *Y02T 10/7005* (2013.01); *Y02T 10/7044* (2013.01); *Y02T 10/7061* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ...... H02J 7/1423; H02J 7/0013; H02J 7/0018; H02J 7/0019

USPC .................. 320/104, 107, 116, 118, 132, 149
See application file for complete search history.

(56) References Cited

U.S. PATENT DOCUMENTS

| 5,726,551 A    | 3/1998 | Miyazaki et al. |
| 6,586,909 B1   | 7/2003 | Trepka |
| 8,633,671 B2   | 1/2014 | Kelly et al. |
| 2011/0011653 A1* | 1/2011 | Mizutani ............. B60L 11/1864 180/65.1 |
| 2011/0234165 A1 | 9/2011 | Palatov |
| 2012/0025769 A1* | 2/2012 | Kikuchi ................ B60L 3/0046 320/118 |
| 2016/0254687 A1* | 9/2016 | Tanaka .................... H02J 7/045 320/112 |

FOREIGN PATENT DOCUMENTS

| CN | 204216603 U   | 3/2015 |
| WO | 2009128079 A1 | 10/2009 |
| WO | 2012055756 A1 | 5/2012 |

OTHER PUBLICATIONS

Translation of JP 2014/193033 (Naoki), Oct. 6, 2014.*

* cited by examiner

*Primary Examiner* — Edward Tso
(74) *Attorney, Agent, or Firm* — David Kelley; Brooks Kushman P.C.

(57) ABSTRACT

A system for a vehicle includes an interpack switch configured to connect portions of a traction battery when closed to transfer electric charge therebetween, and a controller configured to, responsive to a request, operate the switch to disconnect the portions and to initiate transfer of electric charge to each of the portions in parallel and at a same time.

20 Claims, 5 Drawing Sheets

CHARGING A BATTERY USING INTERPACK SWITCH

TECHNICAL FIELD

The present disclosure relates to systems and methods for charging a traction battery.

BACKGROUND

Hybrid-electric vehicles may include at least one electric machine that may be configured as an electric motor or as an electric generator and a traction battery. The traction battery provides power to the electric machine for propulsion and supplies certain accessory loads. Vehicles that utilize a high voltage traction battery may be referred to as electrified vehicles. The traction battery has a state of charge (SOC) that indicates how much electric charge may be available in the battery. To increase the SOC, a hybrid-electric vehicle may employ multiple methods including, but not limited to, charging the traction battery using the momentum of the vehicle to turn a generator and/or electrically coupling the traction battery to an external charging source, also referred to as "plugging in" the car. The traction battery in an electrified vehicle may be recharged using either alternating current (AC) or direct current (DC) charging.

SUMMARY

A system for a vehicle includes an interpack switch configured to connect portions of a traction battery when closed to transfer electric charge therebetween, and a controller configured to, responsive to a request, operate the switch to disconnect the portions and to initiate transfer of electric charge to each of the portions in parallel and at a same time.

A method for a vehicle includes, in response to a charging request, opening by a controller an interpack switch, configured to connect half-packs of a traction battery to transfer electric charge therebetween when closed, to disconnect the half-packs and to initiate transfer of electric charge to each of the half-packs in parallel and at a same time.

A system for a vehicle includes a pair of main contactors configured to transfer electric charge to a traction battery when closed, the battery including a plurality of portions selectively connectable using an interpack switch to transfer electric charge therebetween, and a controller configured to, in response to a request, operate the switch to disconnect the portions and to initiate charging of the portions via the closed contactors in parallel and at a same time.

A system for a vehicle includes circuitry configured to selectively connect portions of a traction battery in series or in parallel, and a controller configured to request a charge current from a charge station at a magnitude that is based on whether the portions are connected in series or connected in parallel, and to charge the portions via the charge current.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
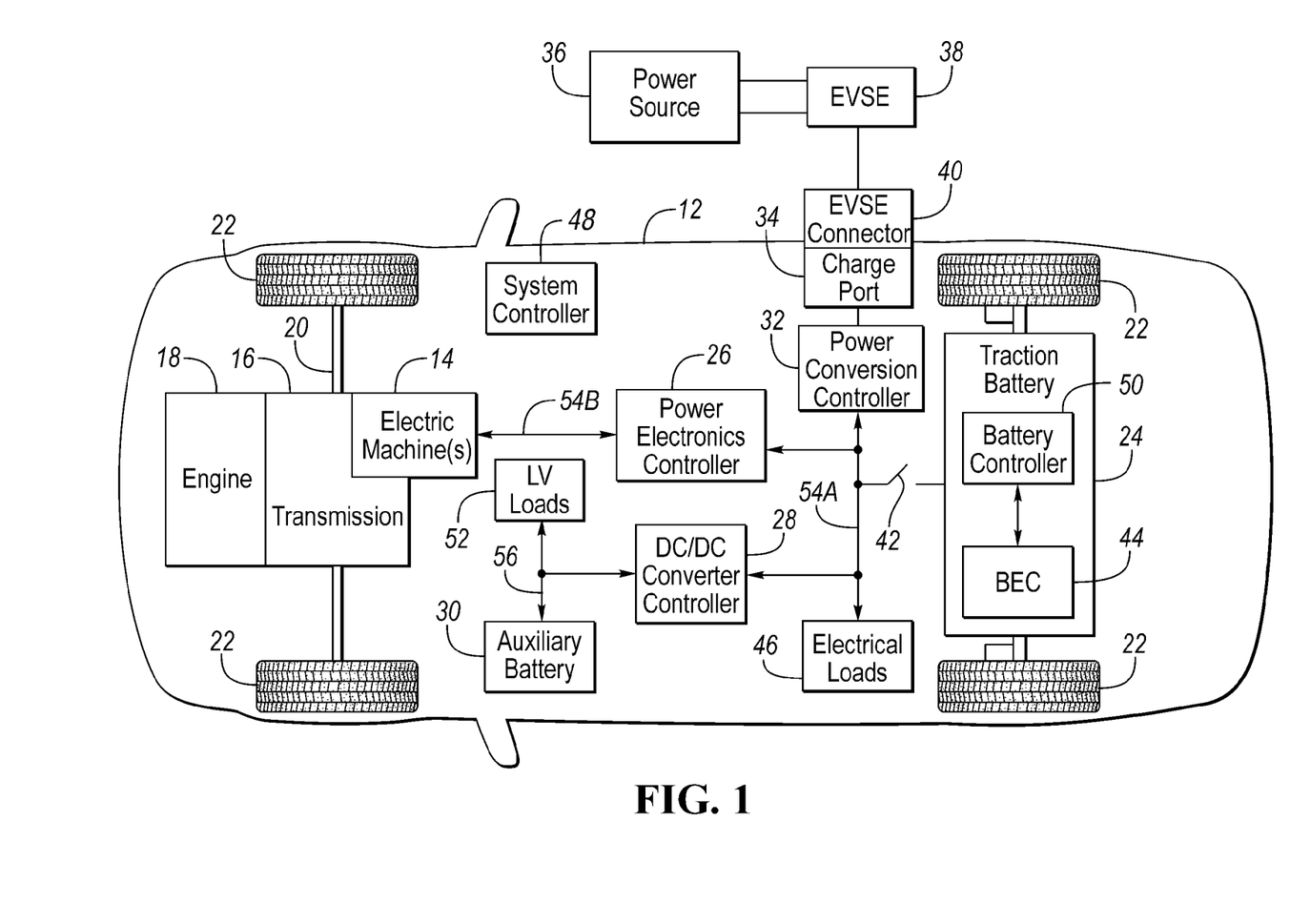
FIG. 1 is a block diagram of a plug-in hybrid electric vehicle illustrating a typical drivetrain and energy storage components.

FIG. 1 depicts a vehicle system 10 for a plug-in hybrid-electric vehicle 12. The vehicle 12 may comprise one or more electric machines 14 mechanically coupled to a hybrid transmission 16. The electric machines 14 may be capable of operating as a motor or a generator. In addition, the hybrid transmission 16 may be mechanically coupled to an engine 18. The hybrid transmission 16 may also be mechanically coupled to an axle 20 mechanically coupled to the wheels 22. While FIG. 1 depicts a typical plug-in hybrid electric vehicle, the description herein is equally applicable to a pure electric vehicle or a hybrid electric vehicle of a different configuration, such as, but not limited to, a series hybrid. For a pure electric vehicle, e.g., battery electric vehicle (BEV), the hybrid transmission 16 may be a gear box connected to the electric machines 14 and the engine 18 may not be present.

The electric machines 14 can provide propulsion and deceleration capability either while the engine 18 is operated or turned off. The electric machines 14 are capable of operating as generators and provide fuel economy benefits by recovering energy that would normally be lost as heat in a friction braking system. The electric machines 14 may additionally impart a reaction torque against the engine 18 output torque to generate electricity for recharging a traction battery 24 the while the vehicle is operating. The electric machines 14 may further reduce vehicle emissions by allowing the engine 18 to operate near the most efficient speed and torque ranges. When the engine 18 is off, the vehicle 12 may be operated in electric-only mode using the electric machines 14 as the sole source of propulsion.

A traction battery 24 stores energy that can be used by the electric machines 14. The traction battery 24 typically provides a high voltage direct current (DC) output. As discussed further in reference to FIGS. 4 and 5, one or more contactors 42 may isolate the traction battery 24 from a DC high voltage bus 54A when opened and couple the traction battery 24 to the DC high voltage bus 54A when closed. While the contactor 42 is illustrated as a separate component, in some examples, the one or more contactors 42 may comprise a bussed electrical center (BEC) 44 configured to communicate with a battery controller 50 allowing the supply and withdrawal of electric energy to and from the traction battery 24. The battery controller 50 may issue a command to the BEC 44 to operate a plurality of switches, e.g., open or close contactors or relays, or otherwise manipulate one or more electrical components controlling transfer of energy to the traction battery 24, in response to one or more operating parameters associated with the traction battery 24 reaching a predefined threshold.

The traction battery 24 is electrically coupled to one or more power electronics controllers 26 via the DC high voltage bus 54A. The power electronics controller 26 is also electrically coupled to the electric machines 14 and provides the ability to bi-directionally transfer energy between alternating current (AC) high voltage bus 54B and the electric machines 14. For example, the traction battery 24 may provide a DC output while the electric machines 14 may operate using a three-phase AC to function. The power electronics controller 26 may convert the DC output of the traction battery 24 to a three-phase AC input that may be necessary to operate the electric machines 14. In a regenerative mode, the power electronics controller 26 may convert the three-phase AC output from the electric machines 14 acting as generators to the DC input compatible with the traction battery 24.

In addition to providing energy for propulsion, the traction battery 24 may provide energy for other vehicle electrical systems. A vehicle 12 may include a DC/DC converter controller 28 that is electrically coupled to the high voltage bus 54. The DC/DC converter controller 28 may be electrically coupled to a low voltage bus 56. The DC/DC converter controller 28 may convert the high voltage DC output of the traction battery 24 and/or the power electronics controller 26 to a low voltage DC supply that is compatible with low voltage vehicle loads connected to the low voltage bus 56. In one example, the low voltage bus 56 may be electrically coupled to an auxiliary battery 30 (e.g., 12V battery). In another example, low voltage systems 52, such as, but not limited to, accessories, lighting, and so on, may also be electrically coupled to the low voltage bus 56.

One or more high voltage electrical loads 46 may be coupled to the high voltage bus 54. The high voltage electrical loads 46 may have an associated controller that operates and controls the high voltage electrical loads 46 when appropriate. The high voltage loads 46 may include compressors and electric heaters. The various components discussed may have one or more associated controllers to control and monitor the operation of the components. The controllers may communicate via a serial bus (e.g., Controller Area Network (CAN)) or via discrete conductors.

In one example, a system controller 48 may be present to coordinate the operation of the various components. The system controller 48, although represented as a single controller, may be implemented as one or more controllers. The system controller 48 may monitor operating conditions of the traction battery 24, the power conversion controller 32 and the electric machine 14. The traction battery 24 may be configured to receive signals indicative of magnitude and direction of current flow through the traction battery 24, voltage level across terminals of the traction battery 24, and so on.

The current sensor and voltage sensor outputs of the traction battery 24 are provided to the system controller 48. The system controller 48 may be configured to monitor the SOC based on signals from one or more sensors, such as current and voltage sensors of the traction battery 24. Various techniques may be utilized to determine the SOC. For example, an ampere-hour integration may be implemented in which the current through the traction battery 24 is integrated over time. The SOC may also be estimated based on, for example, the output of a traction battery voltage sensor. The specific technique utilized may depend upon the chemical composition and characteristics of the particular battery.

An SOC operating range may be defined for the traction battery 24. The operating ranges may define an upper and lower limit at which the SOC may be bounded for the traction battery 24. The traction battery 24 of vehicle 12 may be recharged by an external power source 36 electrically coupled to an electric vehicle supply equipment (EVSE) 38, i.e., a charger or a charging station. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12 and may be electrically coupled to an on-board power conversion controller 32 that conditions the power supplied from the EVSE 38 to provide the proper voltage and current levels to the traction battery 24. Additionally or alternatively, the vehicle 12 may be configured to receive wireless power transfer via a wireless connection to the EVSE 38, such as, but not limited to, inductive charging over-the-air-gap.

While the EVSE 38 as illustrated in FIG. 1 includes a single connection to the EVSE connector 40, arrangements that include more than one connection, whether series, parallel, or a combination of series and parallel connections, between the EVSE 38 and the EVSE connector 40 are also contemplated. Likewise, while the charge port 34 is illustrated in FIG. 1 as being electrically connected to a single EVSE connector, e.g., EVSE connector 40, the disclosure is not so limited and arrangements including multiple EVSE connectors, e.g., the EVSE connectors 40, connected to the charge port 34, whether in series, in parallel, or as a combination of series and parallel connections, are also contemplated. Furthermore, a plurality of the EVSE connectors, e.g., the EVSE connectors 40, in one instance, may be electrically connected to an intermediate connector, e.g. adapter, converter, combiner, splitter, and so on, that is further connected to the charge port 34 and is configured to combine energy supplied by the plurality of the EVSE connectors for transfer to the traction battery 24 of the vehicle 12 via the charge port 34. Additionally or alternatively, in the vehicle 12 configured to receive wireless power transfer one or more components, e.g., the charge port 34, the power conversion controller 32, and so on, may be adapted to combine power received via one or more wired and/or wireless connections to the EVSE 38.

The EVSE 38 may be configured to provide single- or three-phase AC or DC power to the vehicle 12. Differences in the charge connector 40 and/or charging protocol may exist between an AC, a DC, and an AC/DC capable EVSE 38. The EVSE 38 may be configured to provide one of more of a variety of levels of AC and DC voltage including, but not limited to, Level 1 120 volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on. In some examples, both the charge port 34 and the EVSE 38 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charge port 34 may comprise a plurality of terminals, such as, but not limited to, one or more terminals designated for power exchange, a ground connection, receiving and transmitting control signals, and so on. The recesses of the charge port 34 may, in some instances, comprise 7 terminals, with terminals 1 and 2 designated for Level 1 and 2 AC power exchange, terminal 3 designated for a ground connection, terminals 4 and 5 designated for control signals, and terminals 6 and 7 designated for DC charging, such as, but not limited to, Levels 1, 2, or 3 DC charging. The EVSE 38 and the vehicle 12 may therefore be configured to exchange, e.g., via control signal terminals, one or more parameter values, inquiries, or commands associated with a given charging session between the EVSE 38 and the vehicle 12.

Time required to receive a given amount of electric charge may vary among the different charging methods, voltage and current levels, and other parameters associated with a given charging session. It may, in one instance, take several hours to charge a given battery pack using a single-phase AC charging session. In communicating with one or more controllers of the vehicle 12, e.g., the system controller 48, the on-board power conversion controller 32, and so on, in connection with transferring electric charge to the vehicle 12, the EVSE 38 may be configured to accept requests, inquiries, and/or commands regarding a requested level of charge, voltage, current, and other parameters related to a given charging session. In some examples, the EVSE 38 may be configured to initiate a charging session at a first level of charge, magnitude of voltage, magnitude of current and so on, and, responsive to a request from the one or more controllers of the vehicle 12, may modify the level of charge, magnitude of voltage, magnitude of current, or another parameter associated with transferring electric charge to the vehicle 12 in a given charging session. In other examples, one or more controllers of the vehicle 12, e.g., the system controller 48, may command the EVSE 38 to increase or decrease magnitude of one or more voltage, current, and so on of the electric charge being transferred to the vehicle 12. The one or more controllers, in one instance, may issue the command to the EVSE 38 to increase or decrease a magnitude of charge current in response to detecting that one or more switches or contactors of the BEC 44 has opened during charging.

While the above description is directed to transferring energy to a traction battery of an electric or a hybrid electric vehicle, the disclosure is not so limited and transfer of energy to and from a rechargeable battery of any electronic devices, such as, but not limited to, mobile phones, laptops, tablets, global positioning system (GPS) devices, audio players, gaming controllers, cameras, power hand tools, and so on, is also contemplated. Furthermore, the one or more controllers of the vehicle 12, such as controllers 26, 28, 32, 44, 48, 50, and so on, may each include one or more processors connected with both a memory and a computer-readable storage medium and configured to perform instructions, commands, and other routines in support of the processes described herein. For instance, the controllers may be configured to execute instructions of one or more vehicle applications to provide features such as detecting relevant parameter values and displaying notifications including the values, issuing instructions, and so on, regarding charging time, charging rate, and other parameters associated with charge transfer. Such instructions and other data may be maintained in a non-volatile manner using a variety of types of computer-readable storage medium. The computer-readable medium (also referred to as a processor-readable medium or storage) includes any non-transitory (e.g., tangible) medium that participates in providing instructions or other data that may be read by the processor of the computing platform. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. In other examples, the vehicle 12 may include more or fewer controllers. Additionally or alternately, one or more vehicle 12 systems, subsystem, or components may include more or fewer controllers than shown that are configured to perform more or fewer and same or different processes, functions, or operations.

Figure 2:
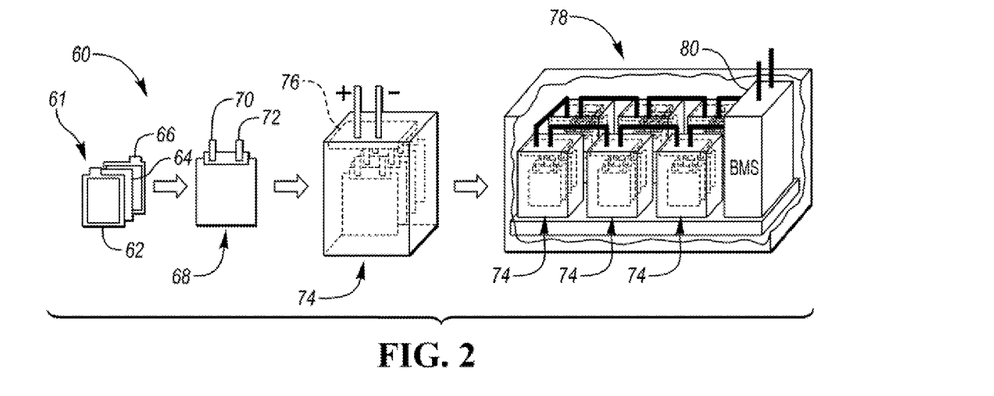
FIG. 2 is a block diagram illustrating traction battery components.

In reference to FIG. 2, a block diagram illustrating an example arrangement 60 for one or more portions the traction battery 24 is shown. The traction battery 24 may include a plurality of mono-cells 61, each having a cathode layer 62 and anode layer 66, also referred to as positive and negative electrodes, respectively, separated by a separator 64. The separator 64 enables current flow between the cathode and anode layers 62, 66 of the mono-cells 61. Each of the mono-cells 61 may further have a predefined nominal voltage.

The predefined number of mono-cells 61, e.g., 20, may be connected together in series or in parallel to define a battery cell 68 including a positive terminal 70 and a negative terminal 72. The mono-cells 61 and the battery cells 68 may, for example, be electrochemical cells, capacitors, or other types of energy storage device implementations. The mono-cells 61 and the battery cells 68 may be arranged in any suitable configuration and configured to receive and store electric energy for use in operation of the vehicle 12. Each cell 68 may provide a same or different nominal threshold of voltage. While the traction battery 24 is described to include, for example, electrochemical battery cells, other types of energy storage device implementations, such as capacitors, are also contemplated.

The battery cells 68 may be further arranged into one or more arrays, sections, or modules further connected in series or in parallel. For example, a plurality of the battery cells 68 connected together in series may comprise a battery module 74. The battery module 74 may include a data connection 76 allowing one or more controllers of the vehicle 12, e.g., the BEC 44, to enable and disable energy flow to and from the battery module 74. Additionally or alternatively, the data connection 76 may include one or more cell sensors in connection with one or more controllers of the vehicle 12, e.g., the battery controller 50. The cell sensors may, for example, include one or more of temperature sensors, voltage sensors, current sensors, and so on.

A predefined number of the battery modules 74 connected together in series or in parallel may define a battery pack 78. The battery pack 78 may include a battery management system 80 configured to monitor and manage, such as via the data connection 76, one or more sub-components of the battery pack 78. In one example, the battery management system 80 may be configured to monitor temperature, voltage, and/or current of the mono-cells 61, the battery cells 68, the battery modules 74, and so on. The battery management system 80 may be in communication with one or more of the BEC 44 and the battery controller 50 and may enable energy flow to and from the battery pack 78 in response to a signal or a command from the BEC 44 and/or the battery controller 50. The traction battery 24 may, in one example, define one or more components similar to those described in reference FIG. 2. Furthermore, the traction battery 24 defining additional and/or different components not specifically referenced in FIG. 2 is also contemplated.

Figure 3:
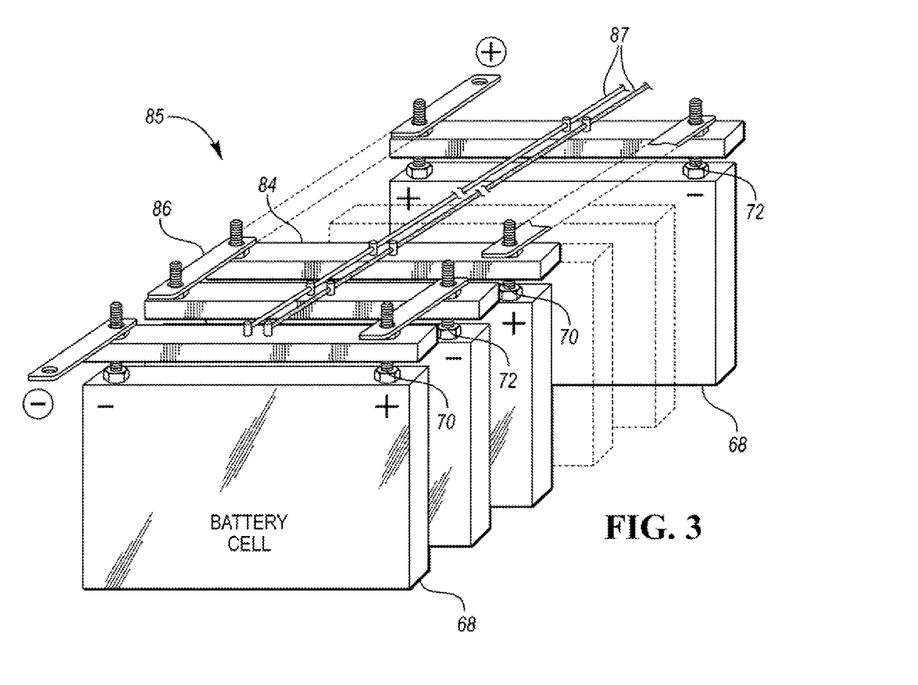
FIG. 3 is a block diagram illustrating connections between traction battery cells.

In reference to FIG. 3, a block diagram illustrating an example arrangement 85 for a plurality of the battery cells 68 connected in series is shown. In one example, a plurality of busbars 86 may each connect the positive terminal 70 of a given battery cell 68 with the negative terminal 72 of another one of the battery cells 68, thereby providing a series connection between respective battery cells 68. A bypass bar 84 may be connected between the positive and negative terminals 70, 72 of the battery cell 68 and may enable current to flow passed a given battery cell 68, such as when a fault was identified with the given battery cell 68.

A shared bus connection 87 may enable data collection from one or more of the battery cells 68. The traction battery 24 may, in one example, define one or more components similar to those described in reference FIG. 3. Furthermore, the traction battery 24 that defines additional and/or different components not specifically referenced in FIG. 3 is also contemplated.

Figure 4:
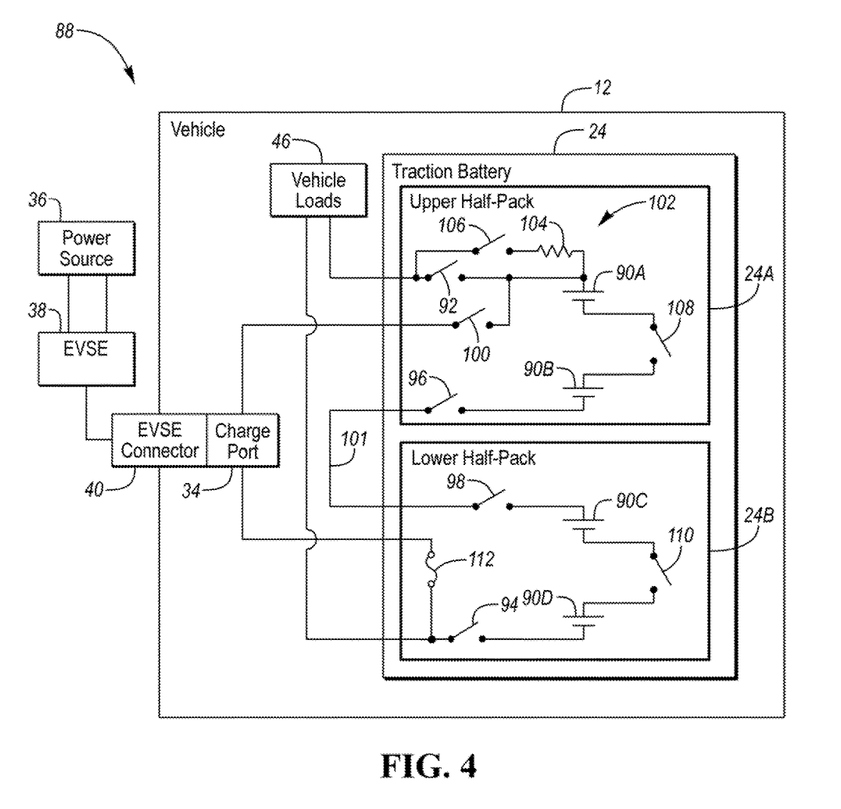
FIG. 4 is a block diagram illustrating a system for charging a traction battery.

In reference to FIG. 4, a block diagram illustrating an example system 88 for charging the traction battery 24 of the vehicle 12 is shown. The traction battery 24 may include a first half-pack 24A, e.g., an upper half-pack, and a second half-pack 24B, e.g., a lower half-pack. The first and second half-packs 24A, 24B may each include a plurality of battery modules, such as the battery modules 74 described in reference to FIG. 2. While the traction battery 24 is illustrated in FIG. 4 as including two portions, e.g., the first and second half-packs, the disclosure is not so limited and more or fewer components defining the traction battery 24 are also contemplated. In one example, the traction battery 24 may include anywhere from one to several thousand individual battery cells, e.g., battery cells 68, thus including a number of portions corresponding to the number of individual battery cells. In another example, the battery cells 68 may be arranged into one or more battery modules, e.g., battery modules 74, thus including a number of portions corresponding to the number of battery modules. Other arrangements of a number of battery portions of a given traction battery 24, such as arrangements based on various combinations of battery cells, battery modules, and so on, are also contemplated.

The first half-pack 24A may include a positive main contactor 92 electrically connected to a positive terminal 90A of the first half-pack 24A. The second half-pack 24B may include a negative main contactor 94 electrically connected to a negative terminal 90D of the second half-pack 24B.

Interpack contactors 96, 98 may be electrically connected with each other via a connection 101 and each electrically connected to a negative terminal 90B of the first half-pack 24A and a positive terminal 90C of the second half-pack 24B, respectively. In one example, closing the positive and negative main contactors 92, 94 and closing the interpack contactors 96, 98 may enable the traction battery 24 to provide power to one or more vehicle loads, such as the vehicle loads 46 described in reference to FIG. 2. The battery controller 50 may be configured to issue a command to the BEC 44 to close the positive and negative main contactors 92, 94 and to close the interpack contactors 96, 98, enabling the traction battery 24 to power one or more vehicle loads. While the traction battery 24 is illustrated in FIG. 4 as including two interpack contactors, e.g., the interpack contactors 96, 98, the disclosure is not so limited and more or fewer interpack contactors defining one or more portions of the traction battery 24 are also contemplated. In one example, the traction battery 24 including a plurality of portions, e.g., one or more battery cells, battery modules, and so on, may include a number of interpack contactors corresponding to the number of individual battery cells, corresponding to the number of battery modules, and so on. Likewise, a number of connections, e.g., the connection 100, in a given traction battery 24 may correspond to a number of portions or a combination of portions of the traction battery 24. In one example, for a given traction battery 24 having an n number of portions, the number of connections between portions may correspond to (n−1).

A pre-charge circuit 102 may include a pre-charge resistor 104 and a pre-charge contactor 106 and may be configured to pre-charge the vehicle load 46 prior to closing of the positive main contactor 92 such that the effect of, for example, in-rush current on the vehicle load 46 may be minimized.

A charge contactor 100 may be electrically connected between the charge port 34 and the positive terminal 90A of the first half-pack 24A, such that closing the charge contactor 100 and the negative main contactor 94 and closing the interpack contactors 96, 98 may enable the traction battery 24 to receive electric charge. In one example, the battery controller 50 may be configured to issue a command to the BEC 44 to close the charge contactor 100 and the negative main contactor 94 and to close the interpack contactors 96, 98, in response to receiving a signal indicating a request to enable charging of the traction battery 24. A fuse 112 may be electrically connected between the charge port 34 and the negative main contactor 94 such that a charging circuit may be disconnected, e.g., opened, when amount of current through the fuse 112 exceeds a predefined amount.

Manual service disconnects (MSDs) 108, 110 connected across respective positive and negative terminals of each of the first half-pack 24A and the second half-pack 24B. The MSDs 108, 110 may be electrical components enabling manual disconnecting, e.g., opening, of a high voltage circuit of the traction battery 24, such as for service of the traction battery 24, and may include a high current fuse (not shown) creating a fused electrical path for the traction battery 24 coupled with a high voltage interlock (HVIL) that controls operation of the high current electrical circuit.

Figure 5:
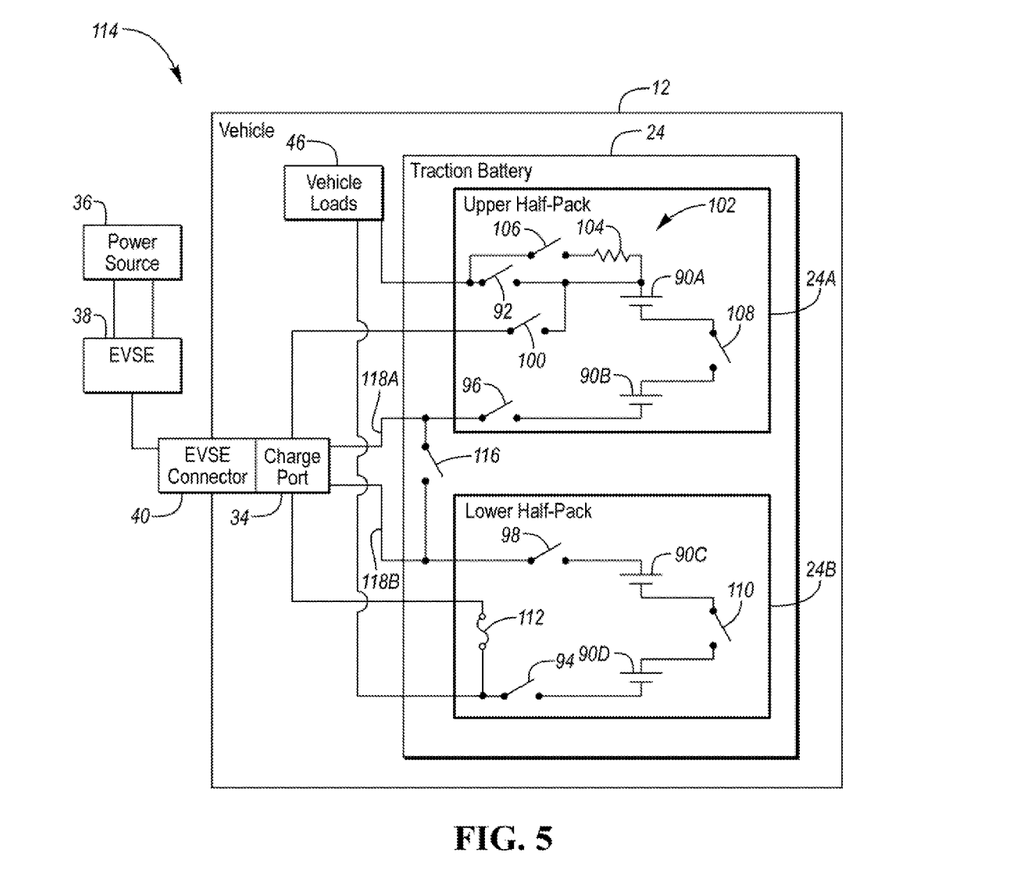
FIG. 5 is a block diagram illustrating a charging system for a traction battery.

In reference to FIG. 5, a block diagram of an exemplary arrangement 114 for charging the traction battery 24 of the vehicle 12 is shown. Additionally or alternatively to components of the traction battery 24 described in reference to FIG. 4, the traction battery 24 may include an interpack switch 116 electrically connected between the first half-pack 24A and the second half-pack 24B, such as via the closed interpack contactors 96, 98. In one example, closing the interpack switch 116 may complete an electrical connection between the first and second half-packs 24A, 24B, e.g., via the closed interpack contactors 96, 98, and opening the interpack switch 116 may open the electrical connection between the first and second half-packs 24A, 24B. The battery controller 50 may be configured to issue a command to the BEC 44 to open or close the interpack switch 116 in response to receiving a request to enable or disable charging of the traction battery 24. In some examples, the battery controller 50 may be configured to issue a command to the BEC 44 to open or close the interpack switch 116 in response to receiving a signal from the EVSE 38 indicating that a different magnitude, e.g., higher magnitude or lower magnitude, of charging current is available for charging the vehicle 12.

While the traction battery 24 is illustrated in FIG. 5 as including one interpack switch, e.g., the interpack switch 116, the disclosure is not so limited and more or fewer interpack switches defining one or more portions of the traction battery 24 are also contemplated. In one example, the traction battery 24 including a plurality of portions, e.g., one or more battery cells, battery modules, and so on, may include a number of interpack switches corresponding to a number of connections, e.g., the connection 100, between the portions of the traction battery 24. In one instance, for a given traction battery 24 having an n number of portions and the number of connections between portions corresponding to (n−1), the number of interpack switches may correspond to (n−1).

The interpack contactor 96 of the first half-pack 24A and the interpack contactor 98 of the second half-pack 24B may each be electrically connected to the charge port 34, such as via connections 118A, 118B, respectively. A number of connections, e.g., connections 118A, 118B, between a plurality of portions defining a given traction battery 24 and the charge port 34 may, in one instance, be based on the number of portions. As another example, fewer than all portions defining the traction battery 24 may have a connection, e.g., the connections 118A, 118B, to the charge port 34 and various combinations of a number of connections to the charge port 34 relative to a number of portions defining the traction battery 24 are also contemplated.

In one example, opening the interpack switch 116 and closing the interpack contactors 96, 98, as well as, closing the charge contactor 100 and the positive and negative main contactors 92, 94, may enable charging of the first half-pack 24A and the second half-pack 24B in parallel and at a same time. The battery controller 50 may be configured to issue a command to the BEC 44 to open the interpack switch 116, in response to receiving a request to enable charging of the traction battery 24. The battery controller 50 may be further configured to issue one or more commands to the BEC 44 to close the interpack contactors 96, 98, close the positive and negative main contactors 92, 94, and close the charge contactor 100 such as to enable the first half-pack 24A and the second half-pack 24B of the traction battery 24 to receive electric charge in parallel and at a same time.

Figure 6:
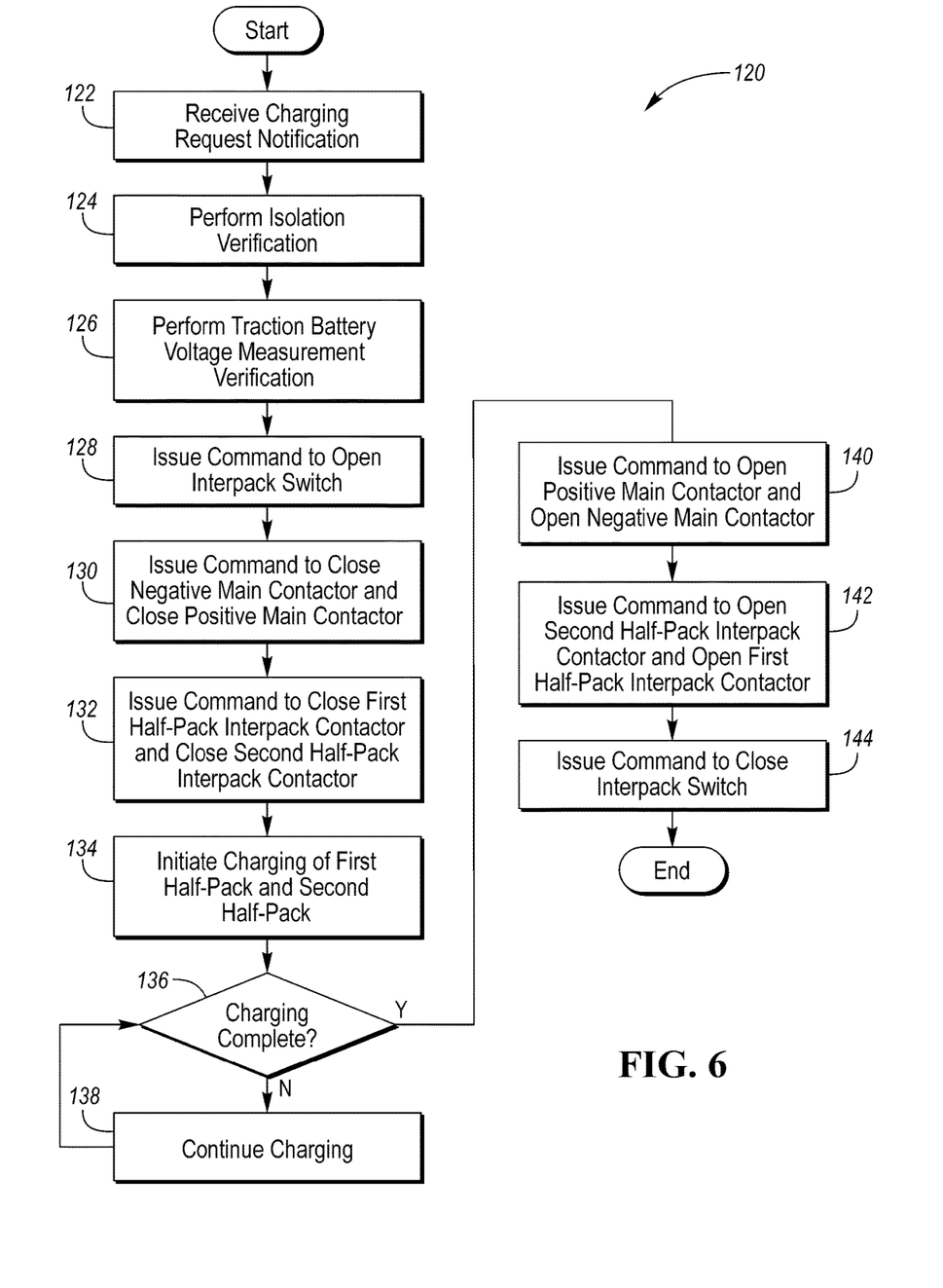
FIG. 6 is a flowchart illustrating an algorithm for charging a traction battery.

In reference to FIG. 6, a flowchart illustrating an example process 120 for charging the traction battery 24 of the vehicle 12 is shown. The process 120 may begin at block 122 where the battery controller 50 receives a notification indicative of a request to charge the traction battery 24. In one example, the battery controller 50 may receive a request to charge the traction battery 24 from one or more controllers of the vehicle 12, such as, but not limited to, the system controller 48, the power conversion controller 32 and so on.

At block 124 the battery controller 50 may perform isolation verification for the traction battery 24. In one example, the battery controller 50 may issue a command to the BEC 44 to apply a predefined AC signal to a negative terminal of a voltage sensor of the traction battery 24. The battery controller 50 may determine that one or more of the battery cells 68 of the traction battery 24 have an isolation fault in response to an amount of degradation of the AC signal being greater than a predefined threshold. The battery controller 50 may transmit a diagnostic message and may exit the process 120 in response to detecting an isolation fault.

The battery controller 50 at block 126 may perform voltage measurement and verification of the traction battery 24. In one example, the battery controller 50 may receive one or more signals indicative of voltage or current measurement from the battery management system 80, from one or more cell sensors, and so on. The battery controller 50 may transmit a diagnostic message in response to detecting that one or more of the battery cells 68 of the traction battery 24 has a voltage level greater than a predefined threshold. The battery controller 50 may then exit the process 120.

At block 128 the battery controller 50 may issue a command to open the interpack switch 116 in response to detecting at block 126 that voltage level of one or more of the battery cells 68 is less than a predefined threshold. In one example, the battery controller 50 may issue a command to open the interpack switch 116 to the BEC 44. The battery controller 50, in some examples, may issue a command to open or close the interpack switch 116 based on one or more signals from the EVSE 38, e.g., such as signals received from the EVSE 38 via the control signal terminals of the EVSE connector 40 electrically connected to the charge port 34. For instance, the battery controller 50 may issue a command to open the interpack switch 116 in response to a signal from the EVSE 38 indicating that a magnitude of charge current may be adjusted based on demand of the vehicle 12.

In response to detecting at block 128 that the interpack switch 116 is open, the battery controller 50 may at block 130 issue a command to close the negative main contactor 94 and to close the positive main contactor 92. In one example, the battery controller 50 may issue a command to close the negative main contactor 94 and to close the positive main contactor 92 to the BEC 44.

In response to detecting at block 130 that the negative main contactor 94 and the positive main contactor 92, the battery controller 50 may at block 132 issue a command to close the interpack contactor 96 of the first half-pack 24A and to close the interpack contactor 98 of the second half-pack 24B. In one example, the battery controller 50 may issue a command to close the interpack contactor 96 of the first half-pack 24A and to close the interpack contactor 98 of the second half-pack 24B to the BEC 44.

The battery controller 50 may initiate charging of the first half-pack 24A and the second half-pack 24B in parallel and at a same time at block 134 in response to detecting at block 132 that the interpack contactors 96, 98 of the first half-pack 24A and the second half-pack 24B, respectively, are closed. In one example, the battery controller 50 may determine that the interpack contactors 96, 98 are closed in response to detecting that voltage measured across one or more of the contactors is less than a predefined threshold. The battery controller 50 may initiate charging of the first and second half-packs 24A, 24B by issuing a command to the BEC 44 to close the charge contactor 100. In another example, the battery controller 50 may initiate charging of the first and second half-packs 24A, 24B by issuing a command to the power conversion controller 32 and/or a controller of the EVSE 38 indicating a request to initiate charging.

The battery controller 50 may determine at block 136 whether charging of the first and second half-packs 24A, 24B of the traction battery 24 has been completed. In one example, the battery controller 50 may determine that the charging of the first and second half-packs 24A, 24B of the traction battery 24 has been completed in response to receiving a predefined signal from the power conversion controller 32 and/or a controller associated with the EVSE 38. At block 138 the battery controller 50 may continue charging in response to detecting at block 136 that the charging of the first and second half-packs 24A, 24B of the traction battery 24 has not been completed. After a predefined period of time the process 120 may return to block 136 where the battery controller 50 determines whether charging of the first and second half-packs 24A, 24B has been completed.

At block 140 the battery controller 50 may issue a command to open the positive main contactor 92 and to open the negative main contactor 94 in response to detecting at block 136 that the charging of the first and second half-packs 24A, 24B has been completed. In one example, prior to issuing a command to open the positive and negative main contactors 92, 94, the battery controller 50 may issue a command to open the charge contactor 100. The battery controller 50 may determine that the positive and negative main contactors 92, 94 have been opened in response to receiving a signal from one or more cell sensors indicating that voltage across the contactors 92, 94 is above a predefined threshold.

The battery controller 50 may at block 142 issue a command to open the interpack contactors 96, 98 in response to detecting at block 140 that the positive and negative main contactors 92, 94 have been opened, e.g., voltage across the contactors 92, 94 is above a predefined threshold. The battery controller 50 may issue a command to close the interpack switch 116 at block 144 in response to determining at block 142 that the interpack contactors 96, 98 have been opened. At this point the process 120 may end. In one example, the process 120 may be repeated in response to receiving a charging request notification or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
   an interpack switch configured to connect at least two cells of a traction battery when closed to transfer electric charge therebetween; and
   a controller configured to, responsive to a request, operate the switch to disconnect the cells and to initiate transfer of electric charge to each of the cells in parallel and at a same time.

2. The system of claim 1, wherein the controller is further configured to, prior to initiating the transfer, issue a command to close a corresponding interpack contactor of each of the cells.

3. The system of claim 1, wherein the controller is further configured to, prior to initiating the transfer, close a pair of main contactors configured to transfer electric charge to and from the traction battery when closed.

4. The system of claim 1, wherein the controller is further configured to, prior to initiating the transfer, close a charge contactor configured to transfer electric charge between a charger and the traction battery.

5. The system of claim 1, wherein the controller operates the switch and initiates the transfer further in response to detecting that a loss of electrical isolation is not present.

6. The system of claim 1, wherein the controller operates the switch and initiates the transfer further in response to detecting that voltage of the traction battery is less than a predefined threshold.

7. A method comprising:
   in response to a charging request, opening by a controller an interpack switch, configured to connect at least two cells of a traction battery to transfer electric charge therebetween when closed, to disconnect the cells and initiate transfer of electric charge to each of the cells in parallel and at a same time.

8. The method of claim 7, wherein the transfer of electric charge to each of the cells is via a corresponding one of interpack contactors.

9. The method of claim 7 further comprising, prior to initiating the transfer, closing a pair of main contactors configured to transfer electric charge to and from the traction battery.

10. The method of claim 7 further comprising, prior to initiating the transfer, closing a charge contactor configured to transfer electric charge between a charger and the traction battery when closed.

11. The method of claim 7, wherein the opening is further in response to a confirmation that a loss of electrical isolation is not present.

12. The method of claim 7, wherein the opening is further in response to voltage of the traction battery being less than a predefined threshold.

13. A system for a vehicle comprising:
    a pair of main contactors configured to transfer electric charge to a traction battery when closed, the battery including at least two cells selectively connectable using an interpack switch to transfer electric charge therebetween; and a controller configured to, in response to a request, operate the switch to disconnect the cells and to initiate charging of the cells via the contactors in parallel and at a same time.

14. The system of claim 13, wherein the controller is further configured to, prior to initiating the charging, close a corresponding interpack contactor of each of the cells.

15. The system of claim 13, wherein the controller is further configured to, prior to initiating the charging, close a charge contactor configured to transfer electric charge between a charger and the traction battery.

16. A system for a vehicle comprising:
electrical switch circuitry configured to selectively connect at least two cells of a traction battery in series or in parallel; and
a processor programmed to request a charge current from a charge station at a magnitude that is based on whether the cells are connected in series or connected in parallel, and to charge the cells via the charge current.

17. The system of claim 16, wherein the magnitude is greater when the cells are connected in parallel then when the cells are connected in series.

18. The system of claim 17, wherein the cells are arranged such that a charge rate of the traction battery associated with the charge current is greater when the cells are connected in parallel then when the portions are connected in series.

19. The system of claim 16, wherein the switch circuitry is configured to connect the cells in series when closed and in parallel when opened.

20. The system of claim 19, wherein the processor is further programmed to command the switch circuitry to selectively open and close based on data from the charge station.

* * * * *